United States Patent
Baker et al.

(10) Patent No.: US 7,804,053 B2
(45) Date of Patent: Sep. 28, 2010

(54) MULTI-SPECTRAL DIRECTION FINDING SENSOR HAVING PLURAL DETECTION CHANNELS CAPABLE OF COLLECTING PLURAL SETS OF OPTICAL RADIATION WITH DIFFERENT BANDWIDTHS

(75) Inventors: Brian C. Baker, Arlington, TX (US); Brett A. Williams, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1698 days.

(21) Appl. No.: 11/003,716

(22) Filed: Dec. 3, 2004

(65) Prior Publication Data

US 2006/0124838 A1 Jun. 15, 2006

(51) Int. Cl.
*H01J 40/14* (2006.01)

(52) U.S. Cl. .................................... 250/221; 250/203.1

(58) Field of Classification Search ................. 250/221, 250/559.29, 559.38, 203.1, 203.2; 356/3.1, 356/3.11, 3.12, 141.1, 146
See application file for complete search history.

(56) References Cited

U.S. PATENT DOCUMENTS

| | | | |
|---|---|---|---|
| 5,162,643 A * | 11/1992 | Currie | 250/206.1 |
| 6,247,666 B1 | 6/2001 | Baker et al. | 244/3.21 |
| 6,480,270 B1 * | 11/2002 | Studnicka et al. | 356/141.1 |
| 6,637,699 B2 | 10/2003 | Banks et al. | 244/3.21 |
| 6,785,610 B2 | 8/2004 | Baker et al. | 701/301 |
| 6,851,645 B1 | 2/2005 | Williams et al. | 244/3.16 |
| 6,882,409 B1 | 4/2005 | Evans et al. | 356/4.01 |
| 7,097,132 B2 | 8/2006 | Banks et al. | 244/3.29 |
| 7,154,590 B2 | 12/2006 | Williams et al. | 356/5.15 |
| 2005/0134513 A1 | 6/2005 | Williams et al. | 343/772 |
| 2006/0038977 A1 | 2/2006 | Williams et al. | 356/28.5 |

* cited by examiner

*Primary Examiner*—Que T Le
(74) *Attorney, Agent, or Firm*—Williams, Morgan & Amerson, P.C.

(57) ABSTRACT

A method and apparatus for determining the position of a target are disclosed. The method includes collecting onboard the platform a first set optical radiation in a first bandwidth and a second set of optical radiation in a second bandwidth reflected from a field of view; and determining the position of the target from the difference between the detected first and second sets of optical radiation. The apparatus includes a pair of detection channels a pair of detection channels, each of which further includes at least three optical channels, each detection channel capable of collecting onboard the platform a first set optical radiation in a first bandwidth and a second set of optical radiation in a second bandwidth, respectively, reflected from a field of view. The apparatus further includes a plurality of electronics capable of determining the position of the target from the difference between the detected first and second sets of optical radiation.

29 Claims, 12 Drawing Sheets

MULTI-SPECTRAL DIRECTION FINDING SENSOR HAVING PLURAL DETECTION CHANNELS CAPABLE OF COLLECTING PLURAL SETS OF OPTICAL RADIATION WITH DIFFERENT BANDWIDTHS

BACKGROUND OF THE INVENTION

1. Field of the Invention

The present position pertains to remote sensing and, more particularly, to remotely sensing the position of an object.

2. Description of the Related Art

Remote sensing technologies continue to become more common as technological capabilities continue to improve. Remote sensing typically revolves around the collection of energy radiated from or reflected by an object of some kind, detecting the collected energy and converting it to some kind of usable data, and then processing the data that signal contains. The data may be processed to, for instance, determine the object's position or even identify it. In some applications, this information can be employed to take some further action, such as to target the object for some kind of attention or to position oneself relative to the object.

However, the quality of the collection effort can limit the effectiveness of even state of the art detection, conversion, and processing. Poor, incomplete, or misleading data, no matter how well it is processed, can yield incorrect results. This problem is particularly acute in military contexts, where obfuscation, camouflage, and countermeasure techniques are routinely used to defeat remote sensing. Not only are these types of techniques commonly employed, such use is typically very aggressive since the stakes can quite literally mean life or death for a combatant.

Consider, for instance, a situation commonly portrayed in popular culture, in which a missile is launched at an aircraft to destroy it. Assume, for purposes of this example, that the missile has remote sensing capabilities. The missile might remotely sense the position of the aircraft so that it can home in on the aircraft. The aircraft will typically try to avoid such an outcome once it becomes aware of the missile's threat. The aircraft may employ countermeasures to confuse the missile's remote sensing capability. For instance, the aircraft may fly directly into the sun, or shoot off flares.

Both of these countermeasures flood the environment the missile is remotely sensing with energy. Typically, the missile will attempt to locate the position of the aircraft by determining the center, or "centroid", of the remotely sensed energy, which it assumes represents the aircraft. This approach works quite well when the aircraft is the only significant energy source that the missile can see. Countermeasures, however, jeopardize the validity of the assumption. When the countermeasures flood the environment with energy, and when the countermeasure is not aligned with the aircraft in the missile's line of sight, additional energy shifts the target away from aircraft and toward the countermeasure. If the energy emanating from a countermeasure is strong enough, and if the countermeasure is sufficiently distanced from the aircraft, it can shift the centroid far enough away from the aircraft that the missile will miss the aircraft as it homes on the centroid.

Similar types of problems may also be encountered in much less dramatic, civilian contexts. Consider a situation in which one might wish to determine the position of an object using a laser rangefinder. The position of the object, or the time of day, or both might create a situation where the Sun creates an obstacle for the laser rangefinder in much the same way that countermeasures confuse the missile. While the consequences are much less extreme, the problem nonetheless remains.

The present invention is directed to resolving, or at least reducing, one or all of the problems mentioned above.

SUMMARY OF THE INVENTION

The invention comprises, in its various aspects and embodiments, a method and apparatus for determining the position of a target. The method comprises collecting onboard the platform a first set optical radiation in a first bandwidth and a second set of optical radiation in a second bandwidth reflected from a field of view; and determining the position of the target from the difference between the detected first and second sets of optical radiation. The apparatus comprises a pair of detection channels a pair of detection channels, each of which comprises at least three optical channels, each detection channel capable of collecting onboard the platform a first set optical radiation in a first bandwidth and a second set of optical radiation in a second bandwidth, respectively, reflected from a field of view. The apparatus further comprises a plurality of electronics capable of determining the position of the target from the difference between the detected first and second sets of optical radiation.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
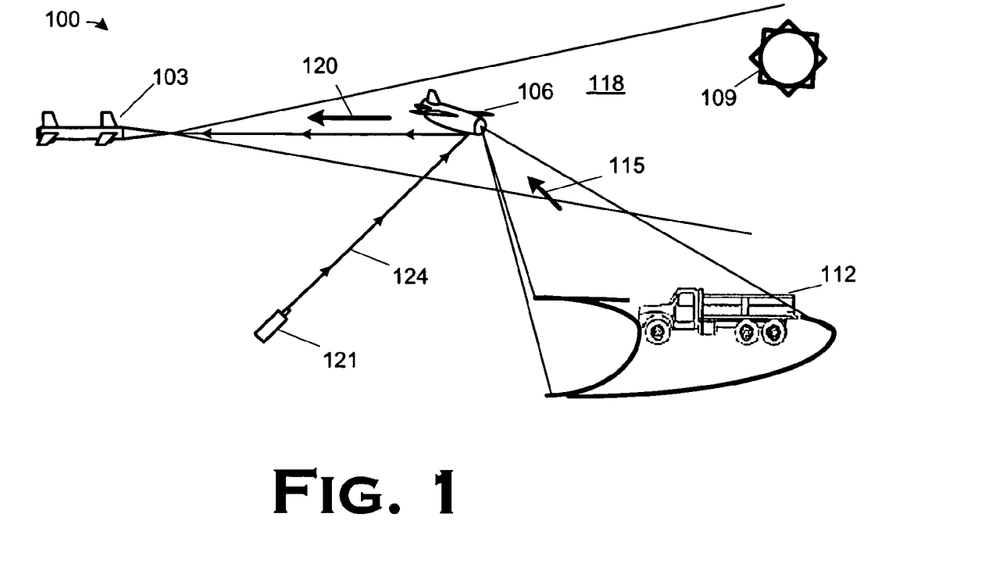
FIG. 1 conceptually illustrates one particular scenario in which a platform may employ the present invention to determine position of a target in the presence of countermeasures or other obstacles.

FIG. 1 illustrates one particular scenario 100 in which a platform 103 may employ the present invention to determine position of a target 106 in the presence of countermeasures or other obstacles, such as the sun 109. In the scenario 100, the target 106 is an aircraft surveilling the truck 112, as indicated by the arrow 115. The platform 103 is a missile seeking to kill the target 106. The platform 103 remotely senses the content of a field of view 118, as indicated by the arrow 120, in which the target 106 is located. Upon detecting the threat from the platform 103, the target 106 may employ one or more countermeasures, such as turning into the sun 109 or launching a flare (not shown). Even if the target 106 does not employ the sun 109 as a countermeasure, radiation emanating from the sun 109 may interfere with the ability of conventional systems to determine the position of the target 106 if it is within the field of view 118 for the platform 103.

Figure 2:
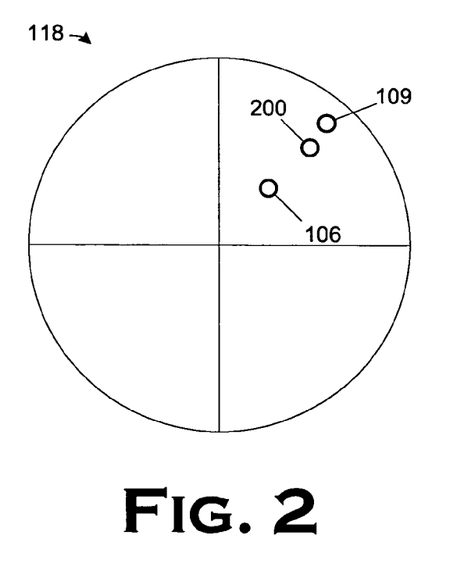
FIG. 2 depicts the location of the target and sun in the platform's field of view and the error that will be produced by conventional systems in the scenario of FIG. 1.

Consider FIG. 2, which illustrates the location of the target 106 and sun 109 in the field of view 118 for the platform 103. Because of the interference from the sun 109, the system will determine the position of the target 106 at the centroid 200 of the radiation detected from within the field of view 118. The error between the positions of the centroid 200 and the target 106 is sufficient to defeat the purpose of the mission. However, the present invention is able to discriminate between, for instance, the sun 109 and the target 106 to accurately determine the position of the target 106 within the field of view 118.

Returning to FIG. 1, the illustrated embodiment of the present invention is a semi-active LADAR system. A source 121 designates the target 106 as the target of interest for the platform 103 by pointing a laser signal 124 at the target 106. The laser signal 124 is reflected by the target 106 to the platform 103. Thus, a bandwidth of interest for the platform 103 is known a priori, i.e., a bandwidth centered on the frequency of the laser signal 124. In various alternative embodiments, the received energy may be in any of several bands, including—but not limited to—the visible, ultraviolet ("UV"), near infrared ("NIR"), medium-wavelength infrared ("MWIR") and long-wavelength infrared ("LWIR") bands, whether these wavelengths originate from laser designation or by virtue of radiation emitted by thermally hot targets. However, the field of view 118 includes a host of ambient radiation that can lead to error in determining the position of the target 106, as was discussed above.

Accordingly, the present invention employs a "primary" channel that detects radiation in the bandwidth of interest and a "guard" channel that detects radiation in a second bandwidth excluding the bandwidth of interest. In one particular embodiment, the primary channel is implemented using Non-Coherent Fresnel Direction Finding ("NCFDF"), or "Optical Monopulse", disclosed and claimed in U.S. application Ser. No. 10/729,066, entitled "Non-Coherent Fresnel Direction Finding Method and Apparatus," filed Dec. 5, 2003, in the name of the inventors Brett A. Williams, et al., and commonly assigned herewith. This reference is hereby incorporated by reference for all purposes as if set forth herein verbatim.

Figure 3A:
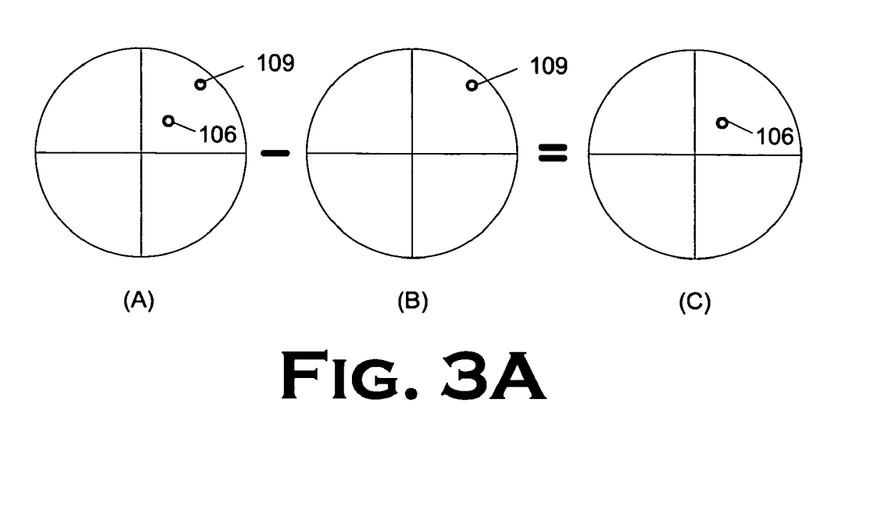
FIG. 3A-FIG. 3B illustrates the process of the current invention by which the target in the scenario of FIG. 1 is discriminated from a countermeasure or other obstacle.

FIG. 3A graphically illustrates the process, wherein the graphic (A) represents the content of the information detected through the primary channel, which includes both the target 106 and the sun 109. The graphic (B) represents the content of the guard channel, which includes only the sun 109. The content from the guard channel (graphic (B)) is subtracted from the content from the primary channel (graphic (A)), the content resulting from which is shown in graphic (C). Note that the sun 109 has been subtracted out, leaving only the target 106.

Figure 3B:
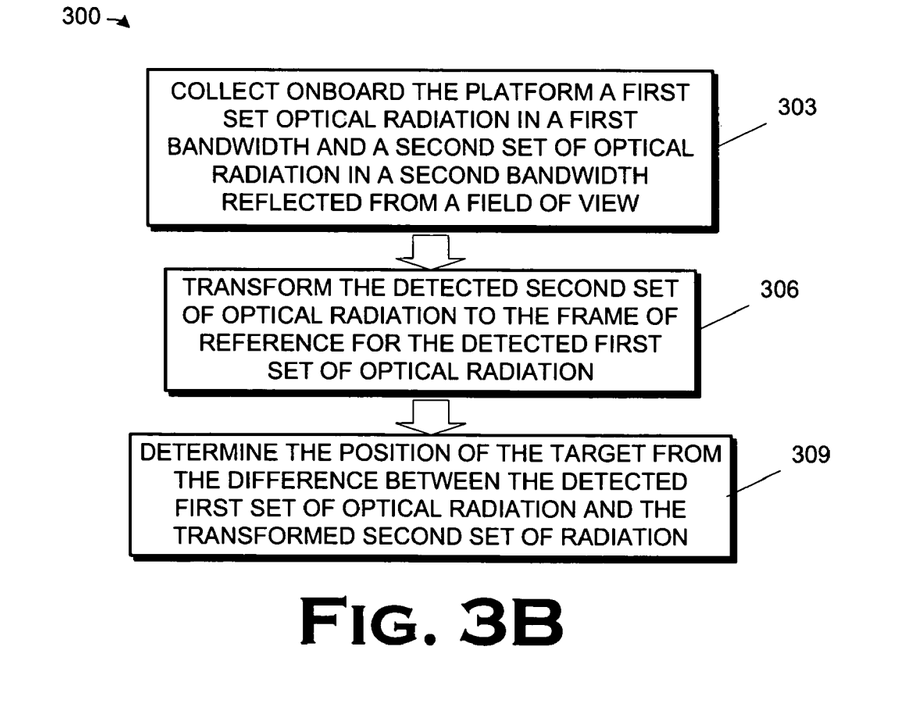

Thus, in one aspect, the present invention includes a method 300, illustrated in FIG. 3B, for determining the position of a target 106 in a field of view 118 of a platform 103, the method comprising:

- collecting (at 303) onboard the platform 103 a first set optical radiation in a first bandwidth and a second set of optical radiation in a second bandwidth reflected from a field of view 118;
- transforming (at 306) the detected second set of optical radiation to the frame of reference for the detected first set of optical radiation;
- determining (at 309) the position of the target 106 from the difference between the detected first set of optical radiation and the transformed second set of radiation.

As will become apparent from the discussion below, the invention admits wide variation in each of these acts as well as in the apparatus with which they may be performed.

Figure 4A:
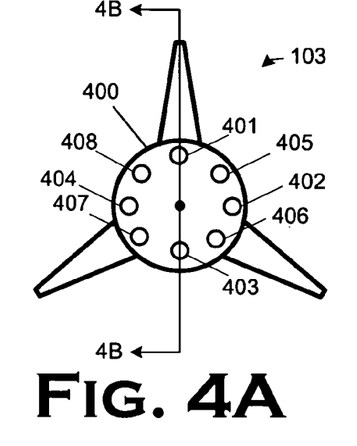
FIG. 4A-FIG. 4B depict one particular implementation of the platform in FIG. 1 in plan, head-on and partially sectioned side views, respectively, the view in FIG. 4B being taken along the line 4B-4B in FIG. 4A.
Figure 4B:
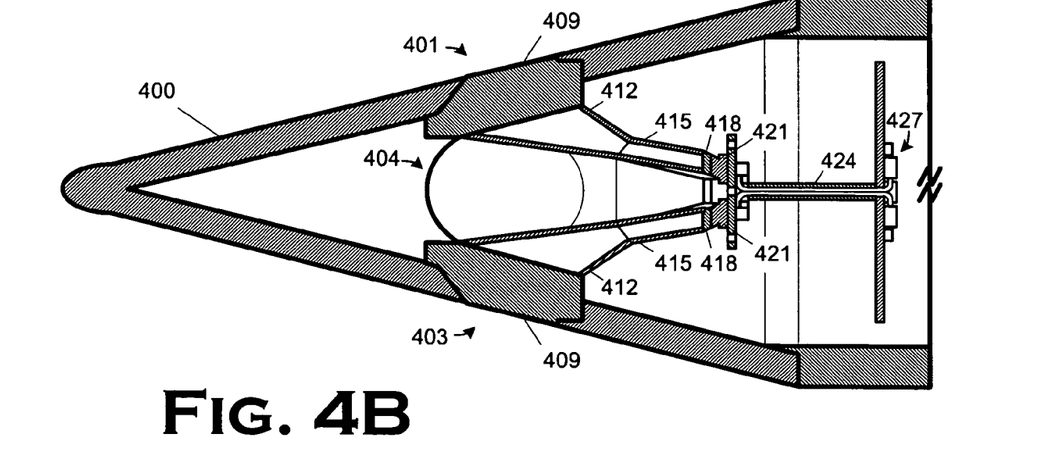

FIG. 4A-FIG. 4B depict one particular implementation of the platform 103 in FIG. 1 in plan, head-on and partially sectioned, side views, respectively, the view in FIG. 4B being taken along the line 4B-4B in FIG. 4A. As previously mentioned, the platform 103 is a missile in the illustrated embodiment. The forward end of the platform 103 comprises a radome 400, in which a plurality of optical channels 401-408 are situated. The optical channels 401-404 comprise the primary channel and the optical channels 405-408 comprise the secondary channel. Note that the optical channels 401-404 are spaced equidistantly about the perimeter of the radome 400; the optical channels 405-408 are spaced equidistantly about the perimeter of the radome 400; and that the optical channels 405-408 are offset from the optical channels 401-404 by 45°.

Note that the invention admits variation in the number of optical channels per primary/guard channel and the total number of optical channels. For instance, the primary channel and the guard channel may comprise any number of optical channels so long as there are at least three. There also is no requirement that the primary channel and the guard channel comprise the same number of optical channels. For instance, the primary channel may comprise four optical channels while the guard channel may comprise three optical channels in some embodiments. There furthermore is no requirement that the optical channels of the primary channel be distinct from those of the guard channel. For instance, some embodiments may employ a total of three optical channels whose functionality is multiplexed between the primary channel and the guard channel.

Referring to FIG. 4B, each of the optical channels 401-408 includes a window 409. The windows 409 are fabricated from a material that transmits the incident radiation, typically a laser pulse, but can also withstand applicable environmental conditions. In the illustrated embodiment, one important environmental condition is aerodynamic heating due to the velocity of the platform 103. Another important environmental condition for the illustrated embodiment is abrasion, such as that caused by dust or sand impacting the windows 409 at a high velocity. Thus, for the illustrated embodiment, fused silica is a highly desirable material for the windows 409. Alternative embodiments may employ ZnSe, $Al_2O_3$, Ge, and Pyrex.

Figure 6A:
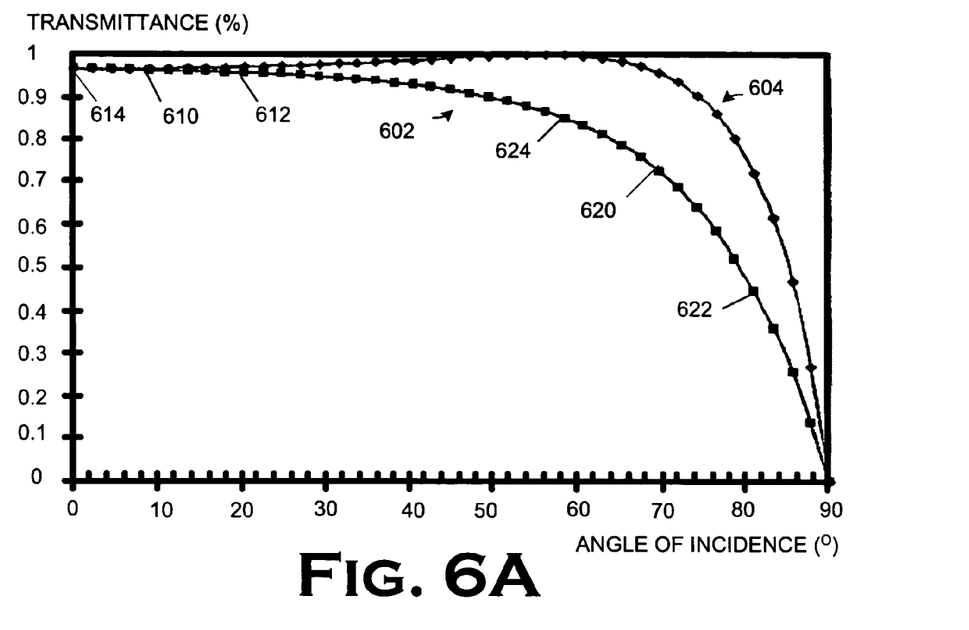
FIG. 6A-FIG. 6B illustrate the relationship between angle of incidence and transmission of radiation impinging on the windows of the radome shown in FIG. 4A-FIG. 4B and in FIG. 5A-FIG. 5C.
Figure 6B:
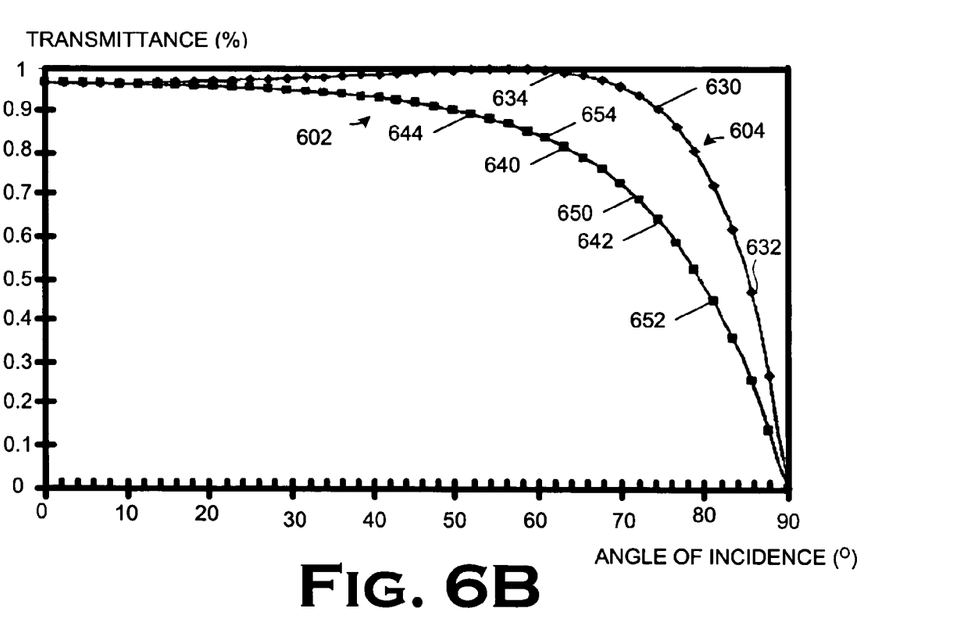

As seen in FIG. 6A, the transmittance of radiation, as a percentage, through an air/fused silica interface is a strong function of both incidence angle and polarization based upon Fresnel's equations:

$$t_s = 2n_i \cos(\theta_i)/[n_i \cos(\theta_i) + n_t \cos(\theta_t)], \text{ and} \quad \text{Eq. (1)}$$

$$t_p = 2n_i \cos(\theta_i)/[n_i \cos(\theta_t) + n_t \cos(\theta_i)]. \quad \text{Eq. (2)}$$

In Fresnel's equations, Eq. 1 and Eq. 2, $t_s$ corresponds to the transmittance for S-polarized (perpendicular) radiation and $t_p$ corresponds to the transmittance for P-polarized (parallel) radiation. $\theta_i$ and $\theta_t$ correspond to the angles of incidence and transmission, respectively. Lastly, $n_i$ and $n_t$ correspond to the indices of refraction for the incident and transmitted materials, respectively. This dependence of the transmittance upon the angle of incidence shall be defined as Fresnel transmittance.

Curve 602 approximates the Fresnel transmittance $t_s$ for radiation incident upon the air/fused silica interface, while curve 604 approximates the Fresnel transmittance $t_p$. At low angles, such as point 610 at 10°, corresponding to a blunt or hemispherical radome, Fresnel transmittance is not a strong function of angle at all. More specifically, for an incident angle of 10°, radiation received within an angle of +10° (point 612) to −10° (point 614) shows virtually no difference in Fresnel transmittance, regardless of polarization. In other words, the instantaneous range of change of the Fresnel transmittance as a function of angle of incidence at 10° is approximately zero. In contrast, an incident angle of 70° (point 620), corresponding to a relative sleek radome, shows significant differences in Fresnel transmittance for angles ±10°. In other words, the instantaneous range of change of the Fresnel transmittance as a function of angle of incidence at 70° is significantly different from zero, i.e., the Fresnel transmittance is rapidly changing as a function of angle of incidence. For an incident angle of 70°, radiation received within an angle of +10° (point 622, 45% transmittance) to −10° (point 624, 85% transmittance) shows a difference in Fresnel transmittance of 40% for S-polarization radiation.

Thus a sleek radome system benefiting from the Fresnel transmittance has a greater angular sensitivity than a blunt or hemispherical radome system. To benefit from the Fresnel transmittance, the incidence angle should be selected such that the Fresnel transmittance of the radiation varies significantly over the desired field of view, i.e., the slope of the Fresnel transmittance is significantly difference from zero. The above example employed a field of view of ±10° and a fused silica-based material for the windows 409. Under these conditions, a minimum angle of incidence at boresight of at least approximately 60° is preferred, with at least approximately 60° being more preferred. The maximum incidence angle is approximately 80° when a ±10 degree field of view is required. Note that these minimum and maximum incidence angles are a function of the window material and the field of view.

Figure 7A:
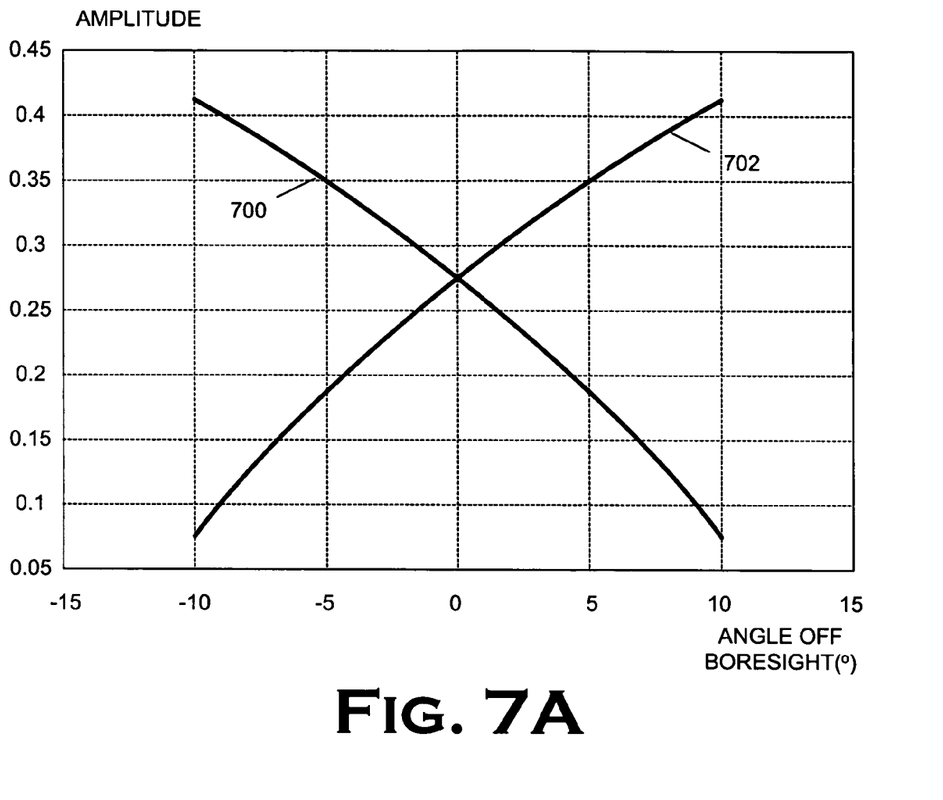
FIG. 7A-FIG. 7D plot various characteristics of signals associated with the illustrated embodiment.

FIG. 7A-FIG. 7D illustrate various signals which are generated within the direction finding system. FIG. 7A illustrates the detection signals of an opposing pair of radiation detectors, such as top and bottom radiation detectors or right and left radiation detectors. As an example, curve 700 corresponds to the detection signal of the left radiation detector and curve 702 corresponds to the detection signal of the right radiation detector. In this instance, the detection signal of the left radiation detector 700 is strongest when the radiation pulse is incident at an angle to the left off boresight and continuously decreases as the radiation pulse is incident at angles increasingly to the right off boresight. This decrease in the left detection signal is due to the decreasing Fresnel transmittance as the angle of incidence increases from left off boresight to right off boresight.

Figure 7B:
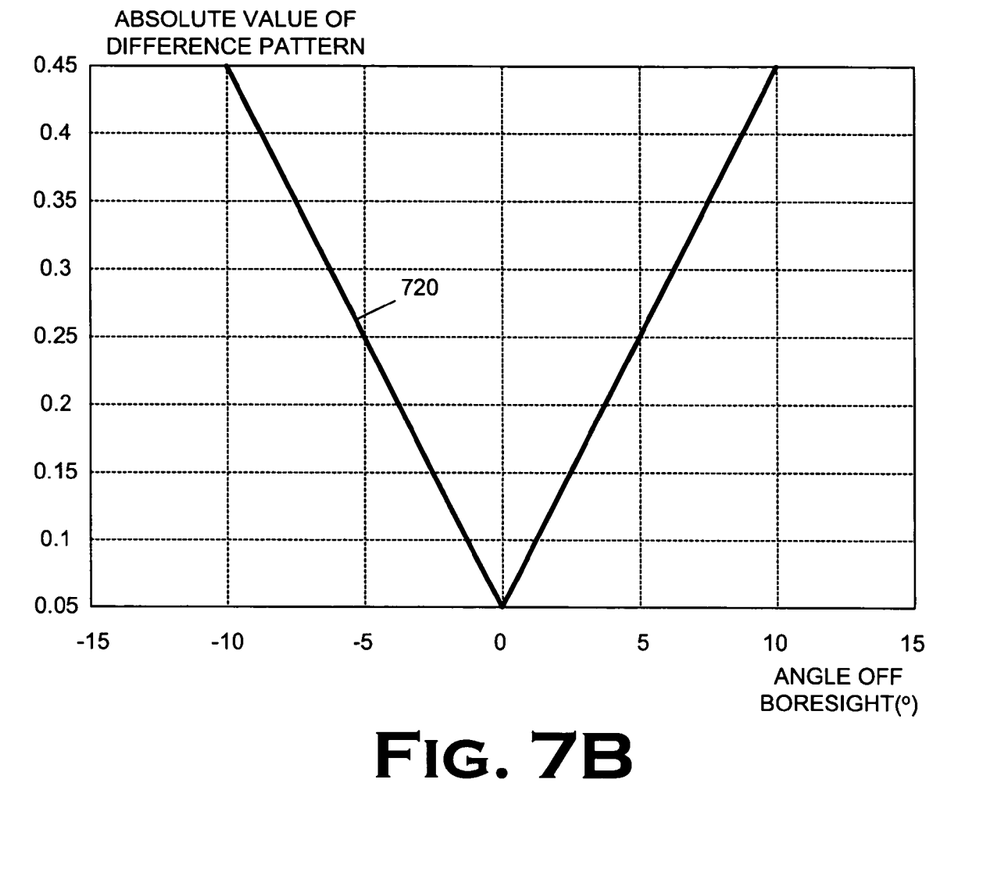
Figure 7C:
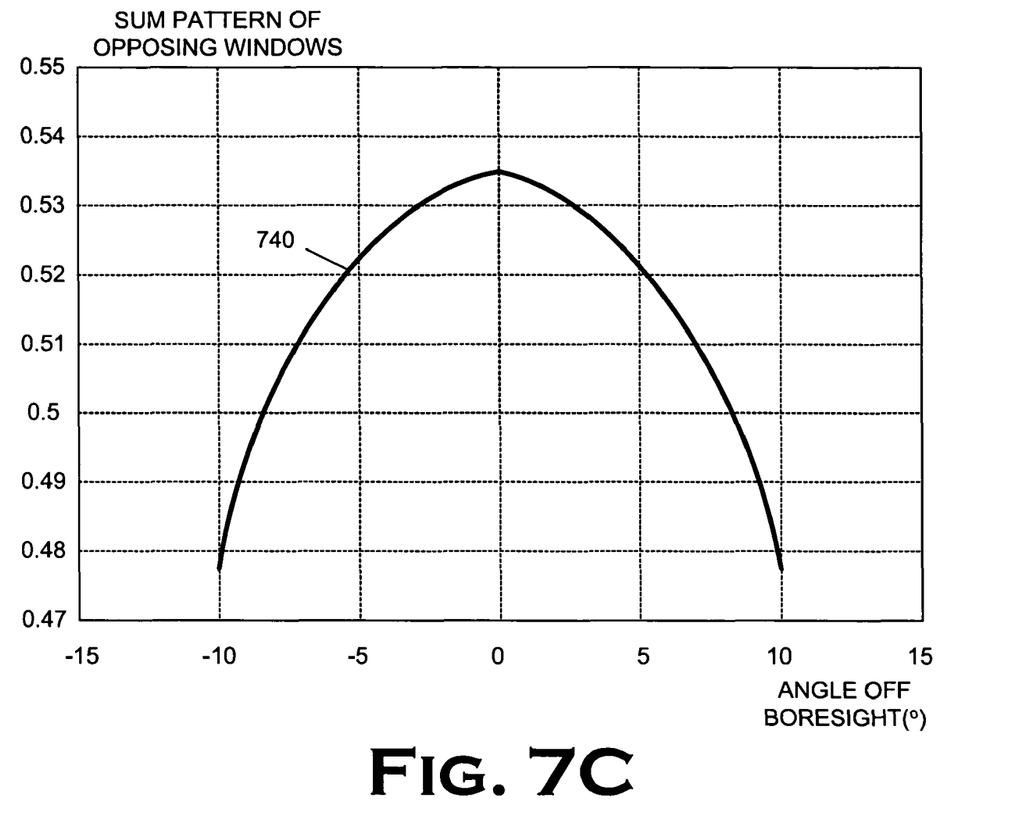
Figure 7D:
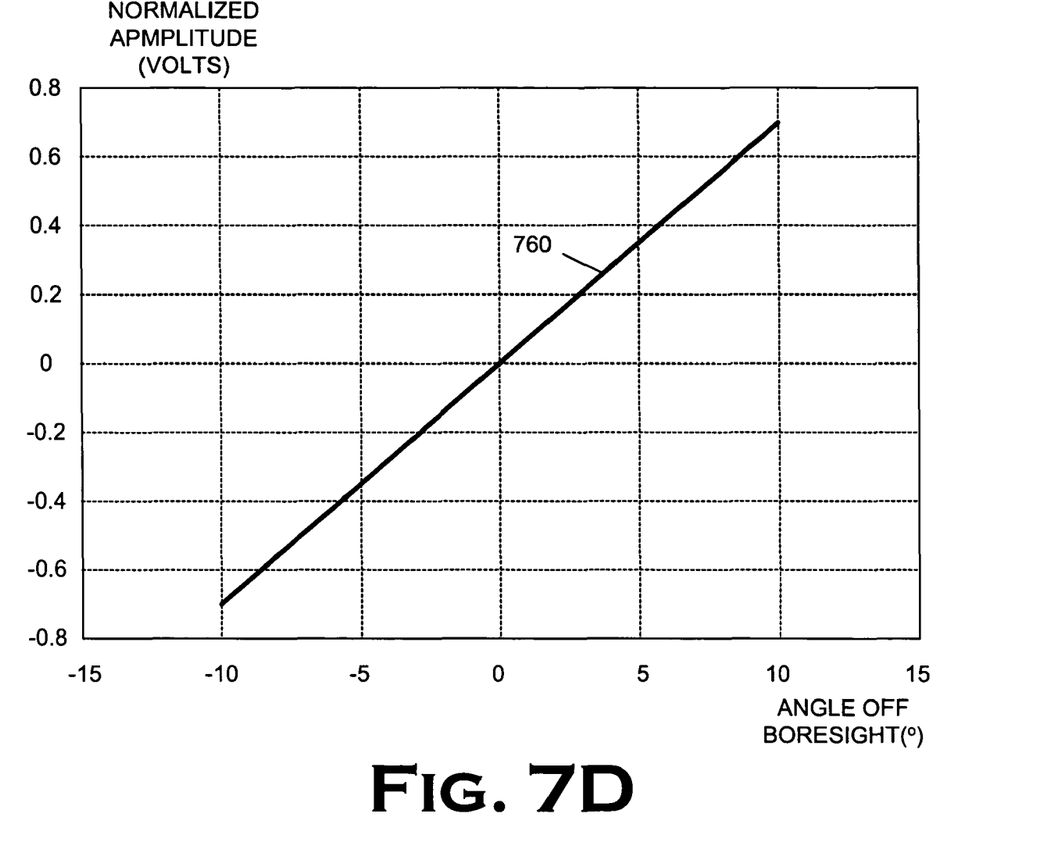

FIG. 7B illustrates the absolute value of the difference 720 between the detection signals of the right and left radiation detectors 700, 702. FIG. 7C illustrates the sum 740 of the detection signals of the right and left radiation detectors. Lastly, FIG. 7D illustrates the difference of the right and left detection signals 720 divided by the sum of the right and left detection signals 740, creating a beta angle error curve 760. Guidance correction for guided munitions typically uses this beta angle error curve 760, as is well known within the art. The signals, and all manipulations thereof, may be conducted in either the analog or the digital domain. However, the digital domain is preferred, as implementing additional signal processing, such as noise reduction, is simpler.

Returning to FIG. 4A, note that each of the optical channels 401-408 includes a separate, dedicated window 409. Depending upon a number of factors, including shape of the radome 400, strength of the window materials, manufacturability, and cost, it may be preferable to implement the windows 409 collectively as a collar (not shown) extending around the perimeter of the radome 400. Thus, the windows 409 comprise a windowing system that, in alternative embodiments, may be implemented in a collar.

Each of the optical channels 401-408 further includes a field of view limiter 412, a light pipe 415, a bandpass filter 418, and a detector 421. The field of view limiter 412 and light pipe 415 comprise an optional waveguide, and act as a waveguide to direct the radiation transmitted through the windows 409 to the detectors 421 through the bandpass filters 418. The bandpass filters 418 are optional, and help to limit the radiation bandwidth permitted, reducing noise and the potential of jamming sources within a wider detector bandwidth. In the illustrated embodiment, the detectors 421 comprise silicon PIN photodetectors such as are well known in the art. Each Silicon PIN photodetector represents a single pixel, such that the output of the detectors 421 in the illustrated embodiment is not useful for imaging. However, alternative embodiments may employ alternative detectors that may yield information that may be imaged.

Figure 5A:
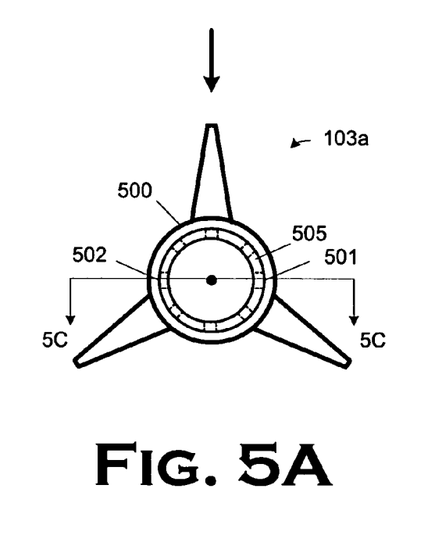
FIG. 5A-FIG. 5C depict a second particular implementation of the platform in FIG. 1 in plan, head-on and partially sectioned side views, respectively, the view in FIG. 5C being taken along the line 5C-5C in FIG. 5A.
Figure 5B:
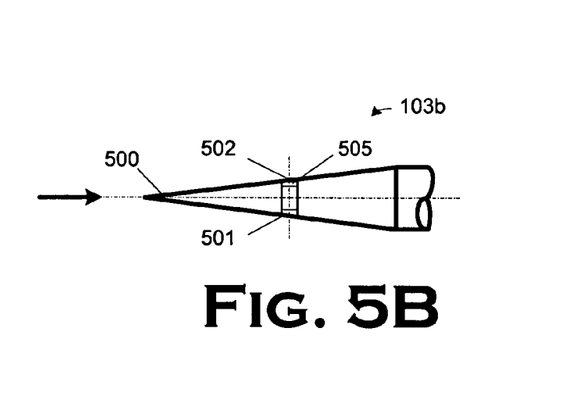
Figure 5C:
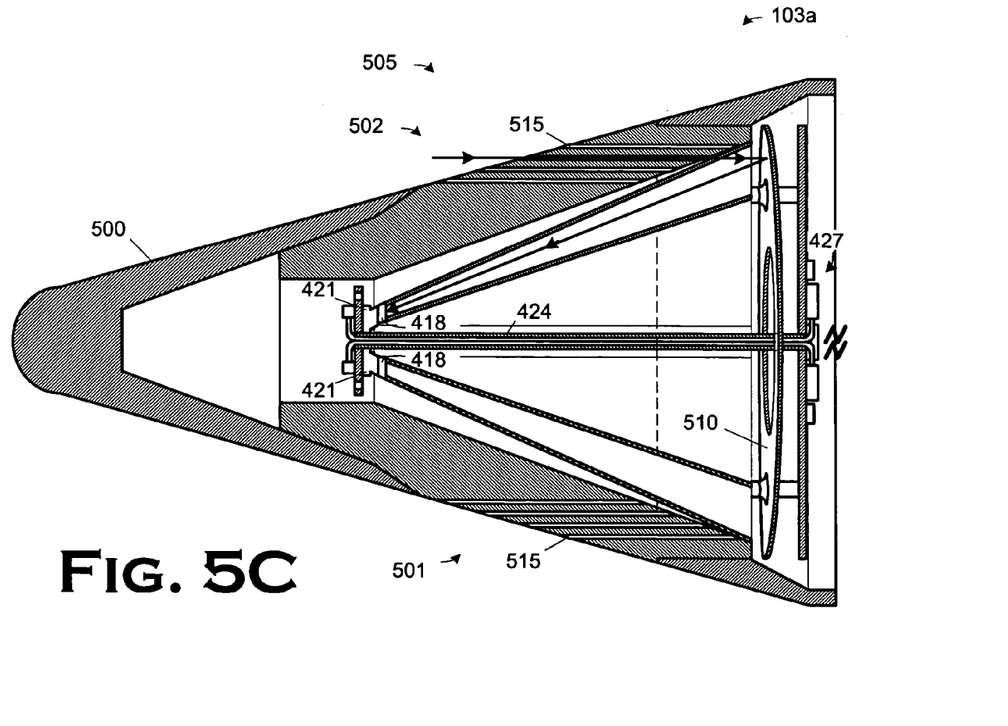

FIG. 5A-FIG. 5C depict one particular implementation 103a of the platform 103 in FIG. 1 in plan, head-on, elevational view; a plan, top, elevational view; and a partially sectioned, side view, respectively. The view in FIG. 5A is taken from the perspective indicated by the arrow in FIG. 5B; the view in FIG. 5B is taken from the perspective of the arrow in FIG. 5A; and the view in FIG. 5C is taken along the line 5C-5C in FIG. 5A. The forward end of the platform 103a comprises a radome 500, in which a plurality of optical channels are situated. Although the embodiment 103a includes 4 primary channels and 4 guard channels, as was the case with the embodiment of FIG. 4A-FIG. 4C, only two optical channels 501, 502 are indicated for the sake of clarity. Similarly, only the optical channels 501, 502 are shown in FIG. 5C for the sake of clarity.

The radome 500 includes a window system 505 that transmits received radiation. The window system 505, like the windows 409 in FIG. 4A-FIG. 4C, may be made of a material such as fused silica, ZnSe, $Al_2O_3$, Ge and Pyrex. The window system 505 shown in FIG. 5A is essentially a collar going around the entire radome 500 and having a constant thickness, although neither feature is necessary to the practice of the invention. Upon transmission through the window system 505, a reflector 510 reflects the received radiation, as represented by the arrow 512, onto the radiation detector 421. The reflector 510 preferably has a curved surface, thereby focusing the received energy onto the radiation detector 421. Alternatives to a curved reflector 510 are reflective holograms and reflecting binary optics. The radiation detector 421 generates a detection signal (not shown) when it absorbs the received radiation.

With respect to the radiation detector 421 used in both the platform 103a and 103a shown in FIG. 4A-FIG. 4C and in FIG. 5A-FIG. 5C, respectively, they should be mechanically robust to withstand vibrations and stresses encountered during launch and operation of the platform 103a and/or the platform 103a. The radiation detectors 421 absorb the received radiation and, thus, selection of the radiation detector 421 depends upon the wavelength of the received radiation. Furthermore, it may be desirable for the radiation detectors 421 to respond to very short durations of the received radiation. Photodetectors comprised of semiconductor material typically meet these requirements and thus are the preferred radiation detectors 421.

Several additional, optional elements may serve to further reduce the noise in the detection of the received radiation. The first additional elements are light baffles 515 (only two indicated). The light baffles 515 form a series of coaxial hollow cylinders that only transmit received energy incident at certain angles. By employing light baffles 515, stray energy can be absorbed by the light baffles 515 prior to being absorbed by the radiation detectors 421. Light tubes (not shown) are an alternative to the light baffles 515. A light tube, much like a soda straw, would only transmit a radiation pulse that is nearly parallel to the axis of the light tube. Other energy not nearly parallel to the axis of the light tube would be blocked and absorbed, much as with the light baffles 515.

Another method of reducing the noise of the guidance system is to use a radiation filter 418. The radiation filter 418, placed in front of the radiation detector 421, blocks a portion of the radiation incident thereon. The radiation filter 418 is preferably a bandpass filter. The method of constructing such a bandpass filter is well known in the art and thus a discussion of the design and construction of a bandpass filter is omitted here. The bandpass filter would transmit radiation within a given wavelength range, while blocking substantially all other radiation. By designing the bandpass filter to transmit radiation of the same wavelength used in the received radiation, the radiation filter 418 would block radiation pulses of different wavelengths, perhaps resulting from countermeasures and/or background radiation.

The use of baffles or light pipes must be accounted for in terms of signal loss and effects to angle accuracy. Baffles, light pipes or any means that affect signal amplitude as a function of angle, including projection or foreshortening of the aperture itself, will reduce detection range and will, in the case of aperture effects, increase beta slope, thus improving track accuracy. A numerical calibration surface for each system in each axis including these effects accounts for variations in system designs and applications, improving system performance.

Figure 8:
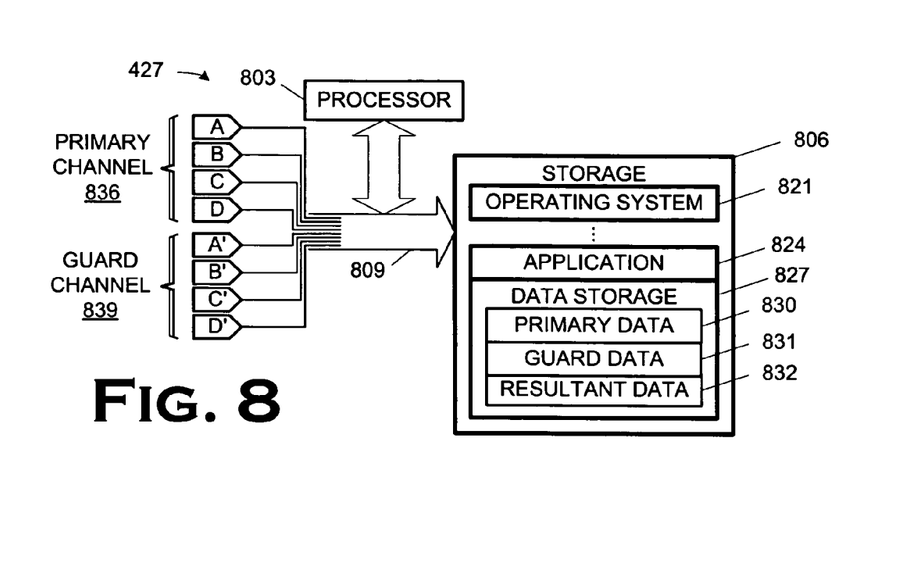
FIG. 8 depicts, in a block diagram, selected portions of the electronics of the implementation of FIG. 4A-FIG. 4B.

In both FIG. 4A-FIG. 4C and in FIG. 5A-FIG. 5C, the detectors 421 are electrically connected through a wiring harness 424 to a plurality of electronics 427 that capture, store, and process the information output by the detectors 421. The detectors 421 are electrically connected through a wiring harness 424 to a plurality of electronics 427 that capture, store, and process the information output by the detectors 421. FIG. 8 depicts, in a conceptualized block diagram, selected portions of the electronics 427 with which certain aspects of the present invention may be implemented. The electronics 427 include a processor 803 communicating with some storage 806 over a bus system 809. In general, the electronics 427 will handle lots of data in relatively short time frames. Thus, some kinds of processors are more desirable than others for implementing the processor 805 than others. For instance, a digital signal processor ("DSP") may be more desirable for the illustrated embodiment than will be a general purpose microprocessor. In some embodiments, the processor 803 may be implemented as a processor set, such as a microprocessor with a math co-processor.

The storage 806 may be implemented in conventional fashion and may include a variety of types of storage, such as a hard disk and/or random access memory ("RAM") and/or removable storage such as a magnetic disk (not shown) or an optical disk (also not shown). The storage 806 will typically involve both read-only and writable memory. The storage 806 will typically be implemented in magnetic media (e.g., magnetic tape or magnetic disk), although other types of media may be employed in some embodiments (e.g., optical disk). The present invention admits wide latitude in implementation of the storage 806 in various embodiments. In the illustrated embodiment, the storage 806 is implemented in RAM and in cache.

The storage 806 is encoded with an operating system 821. The processor 803 runs under the control of the operating system 821, which may be practically any operating system known to the art. The storage 806 is also encoded with an application 842 in accordance with the present invention. The application 824 is invoked by the processor 803 under the control of the operating system 821. The application 824, when executed by the processor 803, performs the process of the invention described more fully below.

Figure 9:
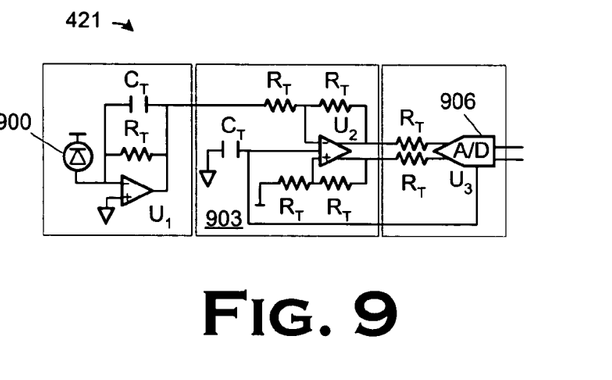
FIG. 9 is a circuit diagram schematically illustrating the function of the detectors of the implementation of FIG. 4A-FIG. 4B.

The storage 806 includes a data storage 827, which comprises at least three data structures 830-832 in which data from the primary channel 836, data from the guard channel 839, and the data from the processing (e.g., the "resultant data") are stored, respectively. The data structures 830-832 may be any suitable data structure known to the art. In the illustrated embodiment, the detectors 421 convert the analog radiation received through the optical channels 401-408 into digital data. FIG. 9 depicts a schematic for an individual detector 421. Each detector 421 detects the radiation received through the respective optical channel 401-406 with a diode 900, amplifies it in an amplification stage 903, and converts it to digital with an analog-to-digital ("A/D") converter 906. The inputs A-C in FIG. 8 represent the digital output of the detectors 421 for the optical channels 401-404 and the inputs A'-C' represent the digital output of the detectors 421. The data received from the inputs A-C is stored in the primary data structure 830 and the data from the inputs A'-C' is stored in the guard data structure 831.

Figure 10:
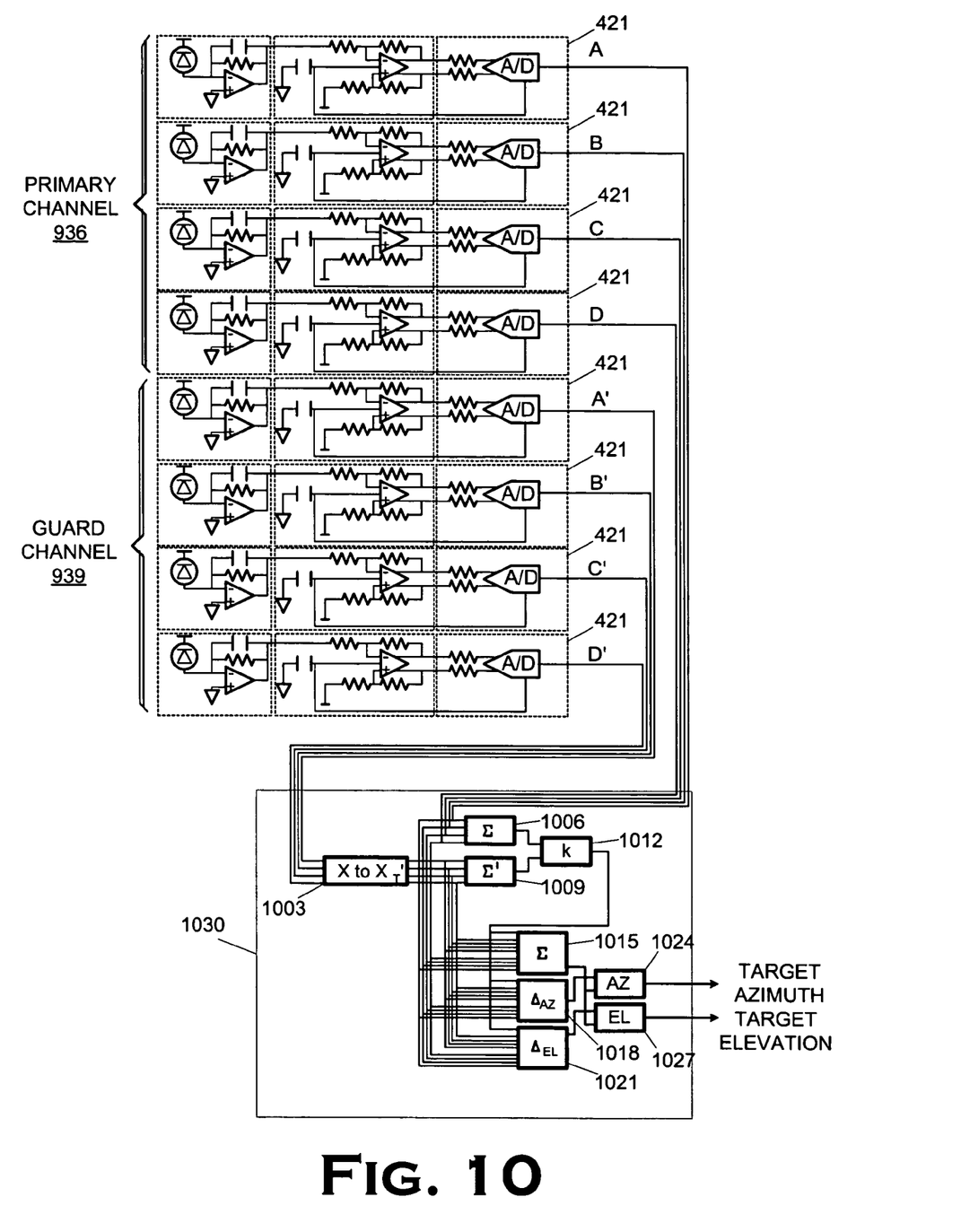
FIG. 10 illustrates one particular embodiment of the data processing of the present invention.

FIG. 10 graphically illustrates the processing of the data collected as described above to discriminate between the target 103 and, for example, the sun 109. As was noted above, the optical channels 405-408 of the guard channel 809 are spatially offset from the optical channels 401-404 of the primary channel 836. Thus, in the illustrated embodiment, the data A'-C' in the guard channel 839 is first transformed (at 1003) into the frame of reference for the data A-C in the primary channel 836. The data A'-C' is rotated 45° in the illustrated example, to create a transformed data set $A_T'$-$C_T'$. Note that this transformation is not necessary in all embodiments. As was mentioned above, in some embodiments, the primary channel 836 and the guard channel 839 may acquire data over the same optical channels. In such an embodiment, the primary channel 836 and the guard channel 839 will no longer be spatially offset. No transformation is then required.

The data A-C and the transformed data $A_T'$-$C_T'$ are then summed (at 1006, 1009). The summations (at 1006, 1009) consequently sum the magnitudes of the received radiation. The summations $\Sigma$, $\Sigma_T'$ are then used to calculate a signal normalization parameter k, which is the ratio of the two sums, i.e.:

$$k = \frac{(A+B+C+D)}{(A_T' + B_T' + C_T' + D_T')}$$

This correction factor, k, is continuously measured throughout flight between laser designated samples to compensate for potentially changing conditions. The summations $\Sigma$, $\Sigma_T'$ and the signal normalization parameter k are then used to determine the sum ("$\Sigma$" at 1015), delta azimuth, ("$\Delta_{AZ}$", at 1018), and delta elevation ("$\Delta_{EL}$", at 1021):

$$\Sigma_T = (A-kA_T') + (B-kB_T') + (C-kC_T') + (D-kD_T')$$

$$\Delta_{AZ} = ((A-kA_T') + (D-kD_T')) - ((C-kC_T')(B-kB_T'))$$

$$\Delta_{EL} = ((A-kA_T') + (B-kB_T')) - ((C-kC_T')(D-kD_T'))$$

from which the target azimuth AZ and the target elevation EL can be determined (at 1024, 1027):

$$AZ = \frac{\Delta_{AZ}}{\Sigma_T'}$$

$$EL = \frac{\Delta_{EL}}{\Sigma_T'}$$

The target azimuth AZ and the target elevation EL then define the position of the target 106 relative to the platform 103 without interference of the sun 109.

Thus, the primary channel has detectors tuned to the laser designator wavelength. The guard channel is tuned to a "jam band." What the guard channel measures is modified to give what would be seen at the target band. That value should be what the target band is getting jammed by. This value is subtracted from the target band in the monopulse equation returning the target's true angle. This correction factor, k, is measured throughout flight to compensate for potentially changing conditions.

As noted, this invention is applicable to passive targets detected by virtue of their heat signature alone with no laser designation. Such targets may also be separated from noise jammers by use of this invention. Regarding laser designated targets, the use of bandwidth is another means of separating noise sources from targets illuminated by short laser pulse designators. That is, short pulses produce spectral components that can be interrogated at a high frequency, while a constant random noise source like the sun or a flare will spread over a broad band. This makes bandwidth filtering a means of separating a laser designated target signal from this kind of jamming source.

However, though any photodiode has bandwidth filtering available as a means of target separation, the present invention provides a new means of doing this with an important addition that bandwidth detection cannot address. For the present invention, angle errors can also be reduced between hot targets which are not laser designated but are interfered with by jamming sources like the sun or flares. From a spectral standpoint, both a hot target and noise source have similar bandwidth characteristics, thus bandwidth filtering will not assist in target location.

The present invention can recover target location of a hot target because it comprises a second set of detector bands, tuned to a wavelength different from the primary channel target band. Both sensors work together to perform the subtraction process in both the laser illuminated and hot target case. In the hot target case, accuracy of the subtraction process is a function of 1) target characteristics and 2) heat signature over wavelength. While the laser designated case allows this invention to provide theoretically perfect jammer removal, removal accuracy in the passive hot target case depends upon the two target metrics just noted. For cases of the sun or other powerful noise sources, performance approaches that of the laser designated case when an off-primary-detector hot target signal is comparatively small.

As those in the art having the benefit of this disclosure will appreciate, some aspects of the processing illustrated in FIG. 10 may be implemented in software, hardware, or a combination of hardware and software. The components in the box 1030, for instance, may be hardware, software, or hardware and software. In the illustrated embodiment, the transformation (at 1003); summation (at 1006, 1009, 1015); normalization factor determination (at 1012); corrected delta azimuth and corrected delta elevation determination (at 1018, 1021); and target azimuth and elevation determination (at 1024, 1027) are all performed in software. These components in FIG. 10 represent functional blocks of code in the application 824, shown in FIG. 8.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 11:
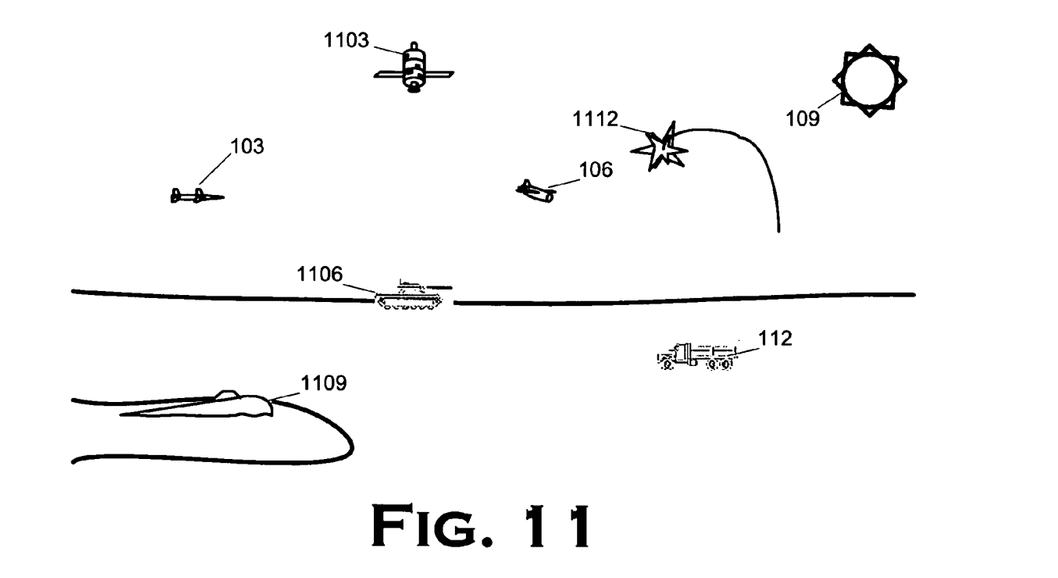
FIG. 11 illustrates alternative embodiments of the platform and the target of FIG. 1, as well as assorted countermeasures that may be encountered in various operational scenarios.

The invention admits wide variation in implementation. FIG. 11 illustrates alternative embodiments of the platform 103 and the target 106 of FIG. 1, as well as assorted countermeasures that may be encountered in various operational scenarios. As was earlier noted, the platform 103 in the illustrated embodiment is a missile and the target is an aircraft, i.e., airborne vehicles. However, either the platform 103 or the target 106 may also be alternatively implemented in a space-based platform (e.g., the satellite 1103); a land-based platform (e.g., the battle tank 1106), or aquatic (e.g., the submarine 1109). Where countermeasures are encountered, alternative countermeasure may include, for instance, flares, represented by the graphic 1112. Note that the invention may also be employed in civilian, as well as military contexts, and that there is no requirement that either the platform 103 or the target be vehicles 106.

Other variations may be implemented in the hardware of the platform 103. For instance, while the description to this point has assumed a single element in each photodetector 421, this is not required. If each photodetector 421 actually comprises two or more individual detector elements (not shown), additional noise reduction is possible. For example, by summing the signals from each individual detector element, the noise in the signal from one detector element will partially cancel the noise in the signal from another detector element. When two or more individual detector elements form each photodetector 421, it is preferable to focus the radiation across all of the individual detector elements such that each is approximately equally illuminated by the radiation.

As was previously mentioned, the scenario 100 involves a passive system employed by the platform 103, i.e., it operates off radiation generated by an external, off-board source 121 designating the target 106. However, the present invention may be employed, with some modification, to both passive and active systems, as well. For a passive system, the hardware of the embodiments in FIG. 4A-FIG. 4B and in FIG. 5A-FIG. 5C need no modification other than in selection of components since passive systems tend to operate on radiation of different wavelengths than do semi-active systems.

Figures 12A, 12B, 12C:
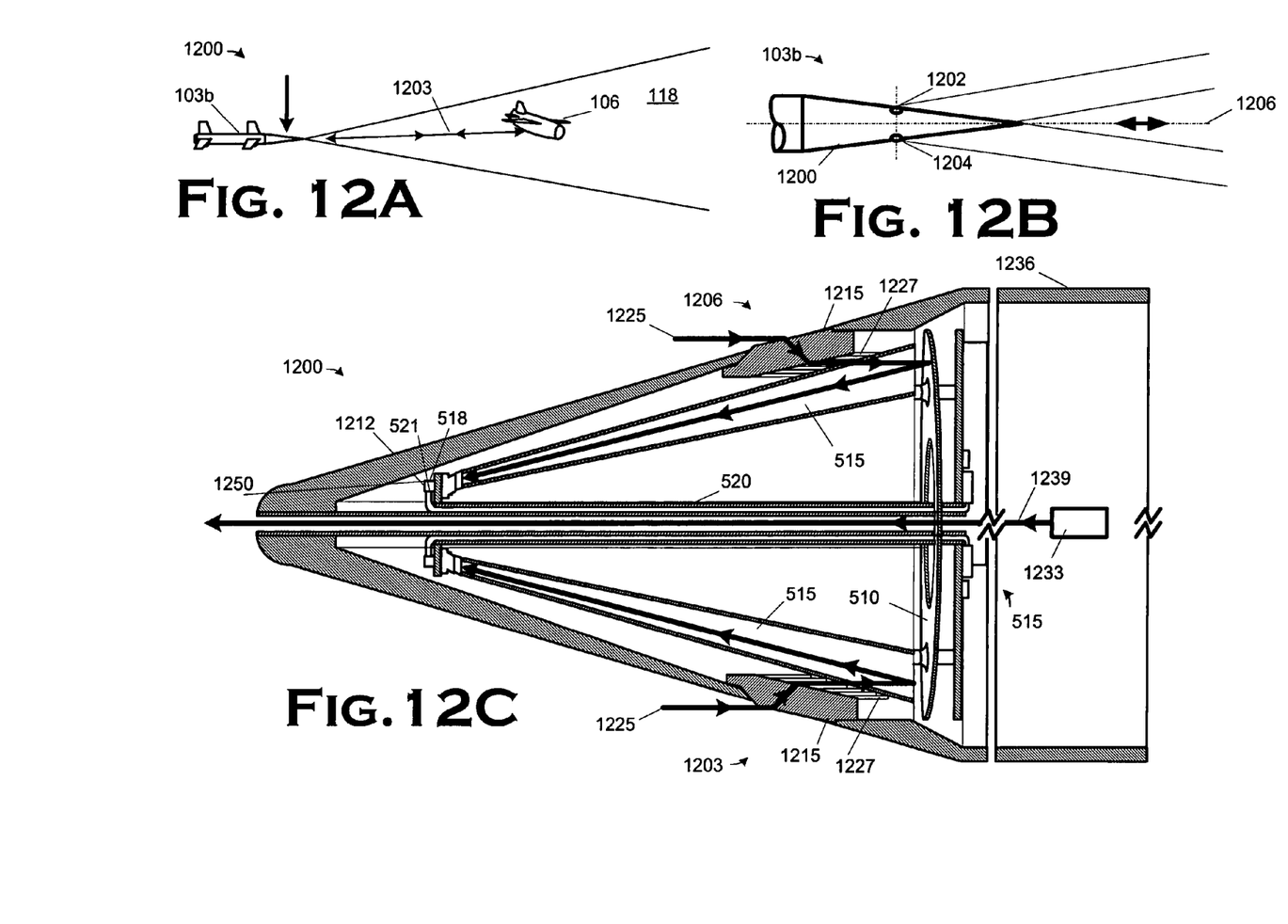
FIG. 12A-FIG. 12C an embodiment in which the present invention is employed in an active system.

The invention may also be implemented in an active system. FIG. 12A-FIG. 12C an embodiment in which the present invention is employed in an active system. FIG. 12A illustrates an active system scenario 1200, in which the platform 103b transmits an optical signal 1203 and receives the reflection from the target 106. FIG. 12C depicts one particular implementation of the forward end of the platform 103b in FIG. 1 in a partially sectioned, side view. FIG. 12C illustrates the construction and operation of exemplary optical channels 1203, 1206 as well as an optical source 1209. The implementation 1200 comprises a radome 1212, in which the plurality of optical channels 1203, 1206 are situated.

In general, the optical channels 1203, 1206 are constructed and operate similarly to the optical channels 501, 502, in FIG. 5A-FIG. 5C, and like parts bear like numbers. As with the embodiment of FIG. 5A-FIG. 5C, some of the optical channels are not shown or discussed in the interest of clarity. Each of the optical channels 1203, 1206 includes a window 1215. Returning to FIG. 12C, each of the optical channels 1203, 1206 further includes a light pipe 515, a reflector 510, a bandpass filter 518, and a detector 521. The light pipe 515 acts as a waveguide to direct the radiation transmitted through the windows 1209 to the detectors 521 via the reflector 510 and through the bandpass filters 515, as represented by the arrows 1225. The optical channels 1202, 1204 also include baffles 515. The detectors 521 are electrically connected through a wiring harness 520 to a plurality of electronics 515 that capture, store, and process the information output by the detectors 521. In the illustrated embodiment, the detectors 521 convert the analog radiation received through the optical channels 1203, 1206 into digital data.

The platform 103b also includes an optical source 1233, housed in the fuselage 1236. Note that, in some embodiments, the optical source 1233 may be housed in the radome 1212. In the illustrated embodiment, the optical source is a laser, such as are well known and commonly used in the LADAR arts. The optical source 1233 generates a signal 1239 that is transmitted from the platform 303 out the aperture 1250 though some optics 1242.

Note that the first and second sets of optical radiation are collected via primary channels and guard channels each comprising at least three optical channels. However, that there is no requirement that the optical channels of the primary and guard channels be distinct so long as the data is not intermingled. In most embodiments, the optical channels, as in those illustrated and discussed above, the optical channels of the primary and guard channel are distinct. However, if the apertures are made sufficiently large, and larger than in the illustrated embodiments, the same optical channels may be used to collect radiation in both the primary and secondary channels. One advantage to such an embodiment is that there is no need to transform (at 306, FIG. 3B) the second set of data.

This concludes the detailed description of the illustrated embodiments. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for determining the position of a target relative to a platform, the method comprising:
    collecting onboard the platform a first set optical radiation in a first bandwidth and a second set of optical radiation in a second bandwidth reflected from a field of view; and
    determining the position of the target from the difference between the detected first and second sets of optical radiation.

2. The method of claim 1, wherein collecting the first and second sets of optical radiation includes:
   receiving the first set optical radiation;
   receiving the second set of optical radiation; and
   detecting the received first and second sets of optical radiation.

3. The method of claim 1, wherein collecting the first set of optical radiation includes receiving the first set of optical radiation via a set of at least three optical channels.

4. The method of claim 3, wherein collecting the second set of optical radiation includes receiving the second set of optical radiation via a second set of at least three optical channels.

5. The method of claim 1, wherein collecting the second set of optical radiation includes receiving the second set of optical radiation via a set of at least three optical channels.

6. The method of claim 1, wherein collecting at least one of the first set of optical radiation and the second set of optical radiation includes filtering the first set of optical radiation.

7. The method of claim 1, further comprising transmitting an optical signal into the field of view whose reflection generates the first set of optical radiation, the optical signal having a wavelength within the first bandwidth.

8. The method of claim 7, wherein the optical signal is transmitted from onboard the platform.

9. The method of claim 7, wherein the optical signal is transmitted from off-board the platform.

10. The method of claim 1, wherein the first and second sets of data are passively collected.

11. The method of claim 1, further comprising transforming the detected second set of optical radiation to a frame of reference for the detected first set of optical radiation.

12. The method of claim 11, wherein transforming the detected second set of optical radiation includes rotating the detected second set of optical radiation to compensate for the angular offset of its collection.

13. An apparatus for use in determining the position of a target relative to a platform, comprising:
   a pair of detection channels, each of which comprises at least three optical channels, each detection channel capable of collecting onboard the platform a first set optical radiation in a first bandwidth and a second set of optical radiation in a second bandwidth, respectively, reflected from a field of view; and
   a plurality of electronics capable of determining the position of the target from the difference between the detected first and second sets of optical radiation.

14. The apparatus of claim 13, wherein each optical channel includes:
   a windowing system through which the radiation is received;
   a detector capable of detecting the received radiation and generating a signal representative thereof; and
   a light tube between the windowing system and the detector.

15. The apparatus of claim 14, wherein the optical channels include at least one of a baffle and a plurality of light tubes.

16. The apparatus of claim 14, wherein the optical channels include at least one of reflector and a filter.

17. The apparatus of claim 13, wherein the detection channels comprise the same optical channels.

18. The apparatus of claim 13, wherein the optical channels of the detection channels are spatially offset.

19. The apparatus of claim 18, wherein the electronics are further capable of transforming the second set of optical radiation.

20. The apparatus of claim 13, wherein at least one of the detection channels is capable of detecting radiation in one of the visible, ultraviolet, near infrared, medium-wavelength infrared, and long-wavelength infrared bands.

21. The apparatus of claim 13, wherein the electronics include:
   a processor;
   a storage in communication with the processor;
   a data structure residing in the storage in which data representative of the received optical radiation is stored; and
   an application that, when invoked by the processor, processes the data to determine the position of the target from the difference between the detected first and second sets of optical radiation.

22. The apparatus of claim 13, further comprising an optical source capable of generating an optical signal into the field of view including the target.

23. An apparatus for use in determining the position of a target relative to a platform, comprising:
   means for collecting onboard the platform a first set optical radiation in a first bandwidth and a second set of optical radiation in a second bandwidth, respectively, reflected from a field of view; and
   means for determining the position of the target from the difference between the detected first and second sets of optical radiation.

24. The apparatus of claim 23, wherein the collecting means includes:
   a windowing system through which the radiation is received;
   means for detecting the collected radiation and generating a signal representative thereof;
   means for guiding the radiation between the windowing system and the detecting means.

25. The apparatus of claim 24, wherein the collecting means include at least one of a baffle and a plurality of light tubes.

26. The apparatus of claim 24, wherein the collecting means include at least one of reflector and a filter.

27. The apparatus of claim 23, wherein at least one of the first and second bandwidths comprises a portion of one of the visible, ultraviolet, near infrared, medium-wavelength infrared, and long-wavelength infrared bands.

28. The apparatus of claim 23, wherein the determining means includes:
   a processor;
   a storage in communication with the processor;
   a data structure residing in the storage in which data representative of the received optical radiation is stored; and
   an application that, when invoked by the processor, processes the data to determine the position of the target from the difference between the detected first and second sets of optical radiation.

29. The apparatus of claim 23, further comprising means for generating an optical signal into the field of view including the target.

* * * * *